UNITED STATES PATENT OFFICE.

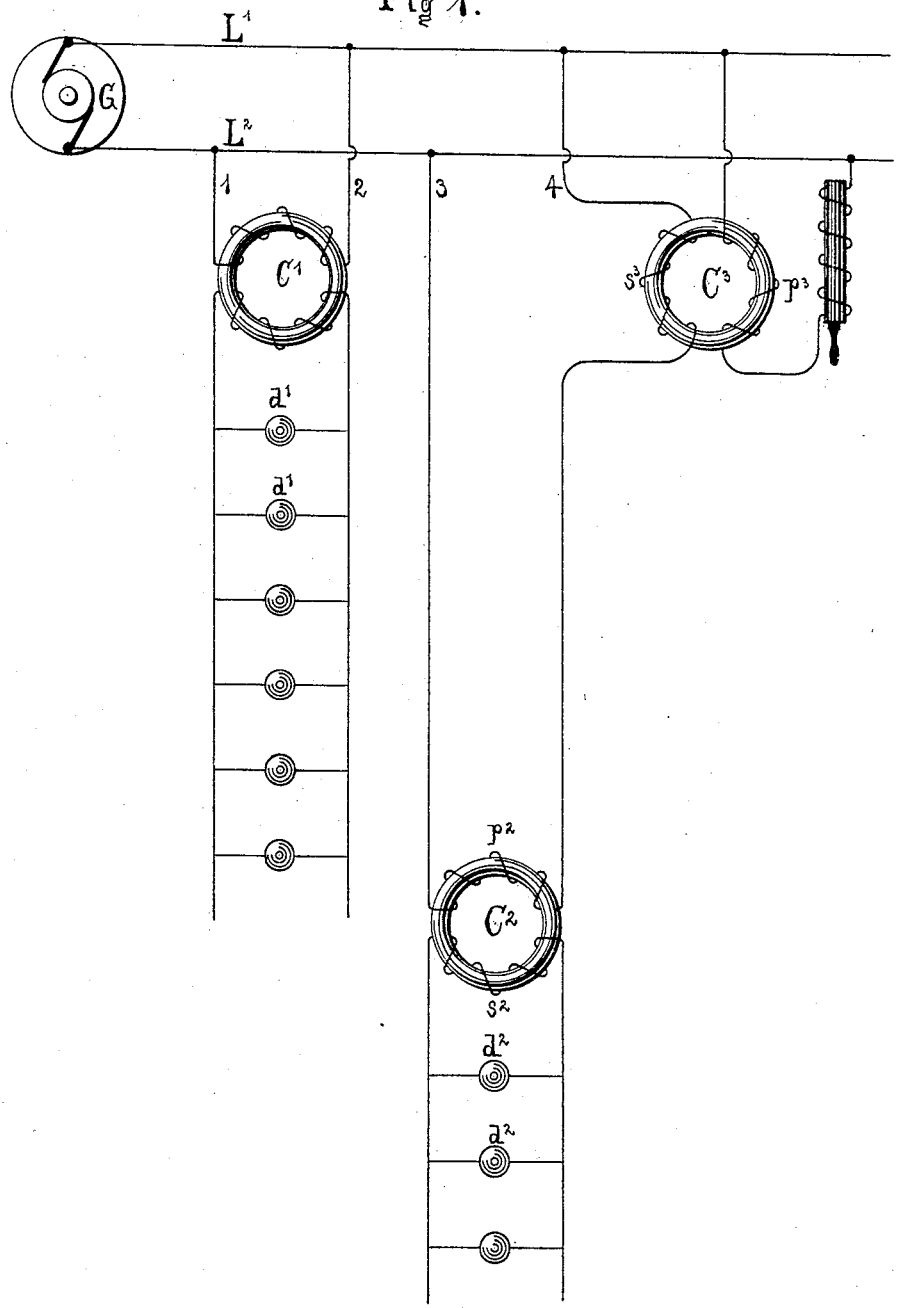

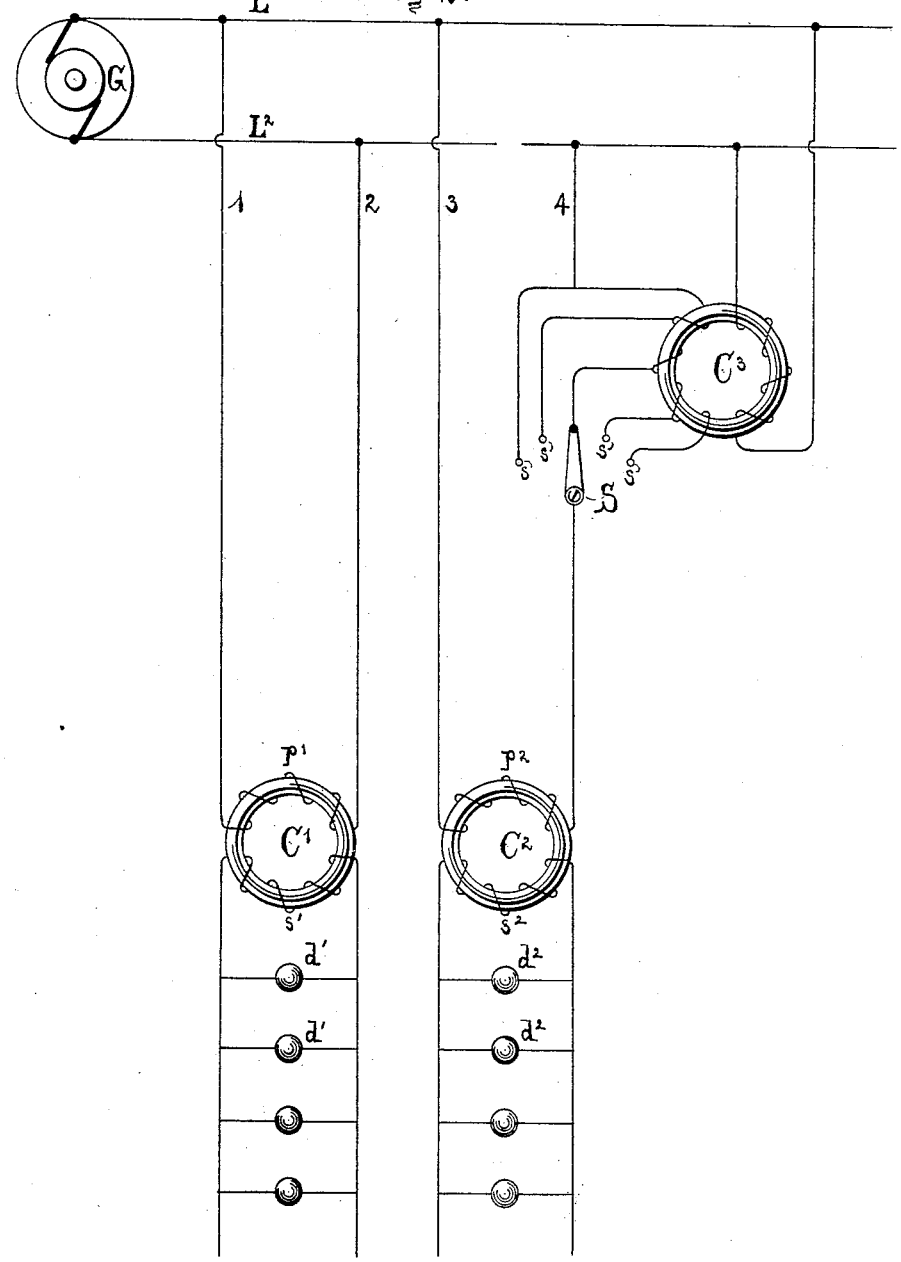

LEWIS B. STILLWELL, OF PITTSBURG, PENNSYLVANIA, ASSIGNOR TO THE WESTINGHOUSE ELECTRIC COMPANY, OF SAME PLACE.

METHOD OF REGULATION FOR SYSTEMS OF ELECTRICAL DISTRIBUTION.

SPECIFICATION forming part of Letters Patent No. 399,219, dated March 5, 1889.

Application filed October 26, 1888. Serial No. 289,239. (No model.)

*To all whom it may concern:*

Be it known that I, LEWIS B. STILLWELL, a citizen of the United States, residing in Pittsburg, in the county of Allegheny and State of Pennsylvania, have invented a certain new and Improved Method of Regulating Systems of Electrical Distribution, (Case 248,) of which the following is a specification.

The invention relates to those systems of electrical distribution in which alternating, intermittent, or pulsatory electric currents are employed for operating translating devices located at various more or less distant points. In organizing such systems it is customary to arrange the translating devices in groups, dependent upon their locations, and to supply the requisite currents to the different groups from a common source through independent supply-circuits or "feeders", as they are commonly termed. In practice it is found that the difference of potential applied to the translating devices through these feeders is liable to vary from time to time, even though the difference of potential applied thereto at the central station is maintained approximately constant. The variations in the difference of potential at the translating devices is usually due to the different resistances of the different supply-circuits or feeders and to the varying work being done in the circuits. It is evident that if conductors of a given size are employed for each of the supply-circuits the resistances of those circuits will vary according to their lengths, so that if the same difference of potential is applied to all of the feeders at the source the difference of potential at the translating devices will be in some circuits greater than in others. If the amount of work being done in any given circuit is increased or decreased, the current required in that circuit will be increased or decreased accordingly, and therefore the loss of potential upon that circuit will be greater in proportion as the work is increased, or less as the work is decreased. If the variations in the loss upon the several different feeders were coincident, then the difference of potential applied to the translating devices might be maintained approximately constant by increasing or diminishing the difference of potential applied at the station; but it is evident that if the loss upon one circuit increases while that upon another remains constant an increased difference of potential applied to all the circuits would result in an undue increase of potential applied to the translating devices in those circuits requiring no change, so that it becomes necessary to provide means for varying the difference of potential applied to any given circuit without sensibly changing that applied to the others.

In systems of distribution where secondary generators or converters are connected in the feeders, and translating devices are connected in their secondary circuits, there is a slight loss of potential in the converter itself dependent upon the load or work being done in the secondary circuit.

The object, therefore, of my invention is to overcome these difficulties and to provide means for obtaining any required difference of potential upon any given circuit, and for compensating for the loss or drop in any given circuit, whether due to the resistance of the conductors conveying the current from the source to the translating devices or to the varying work being done, or to any other cause, and to insure that each group of translating devices shall at all times be supplied with a proper difference of potential.

Prior to my invention it has been proposed to construct the translating devices which are placed in the different groups so as to require a difference of potential dependent upon their distance from the source of supply, or upon the loss in the feeding-circuits leading thereto. This plan is objectionable for the reason, among others, that it involves different forms of translating devices for different feeders, and does not provide for the varying number of translating devices which are being operated and the consequent variation in the drop upon the line.

My invention consists in developing a normal electro-motive force at the central station sufficient to supply the requisite difference of potential to the translating devices included in the circuits having the least loss or drop, and in increasing the difference of potential upon any given circuit by applying a supplemental electro-motive force to that circuit sufficient to compensate for the loss or drop, or to raise the difference of potential to any required extent that may be desired for other reasons. It also involves the obtaining of any required variations in the amount of electro-motive force added to any circuit. This may be accomplished in different ways, two of which will be described in connection with the accompanying drawings.

Instead of developing a difference of potential sufficient only to supply the translating devices in the circuits having the least drop, however, it may be sometimes desirable to develop a higher electro-motive force and reduce the difference of potential upon certain circuits while increasing it upon others. Such a system is described in another application of even date herewith filed by me.

In the drawings, Figure 1 represents one organization of circuits adapted to carry out the invention, and Fig. 2 is a modification.

Referring to the figures, G represents any suitable source of alternating, intermittent, or pulsatory electric currents, and L′ L² a circuit derived therefrom. This circuit may be supplied either directly or indirectly from the generator or through an electric converter.

The regulator may be connected to the circuit at the central station, or at a point at any distance therefrom, as required.

From the circuit L′ L² different supply-circuits or feeders 1 2 and 3 4 are derived. These, respectively, supply groups of translating devices, as shown at $d'$ $d'$ and $d^2$ $d^2$. The devices may be supplied with current either directly from the conductors 1 2 and 3 4 or through electric converters, as shown at C′ C². The translating devices may be electric lamps, electric converters, electric motors, or other electrically-operated apparatus. Only one converter is shown as connected in the separate feeders; but any required number may be so connected. Considering, now, that the circuit 3 4 is longer, or for some other reason has a greater drop or loss of potential than the circuit 1 2, then, unless means are provided to prevent it, there will be less difference of potential applied to the terminals of the primary coil $p^2$ of the converter C², and consequently the translating devices $d^2$ will be supplied with a less difference of potential. For this reason, therefore, a device, C³, is employed for adding to the difference of potential upon the circuit 3 4 an additional difference of potential sufficient to compensate for the drop or loss upon that circuit. This device consists in the organization shown in Fig. 1 of an electric converter having its primary coil $p^3$ connected between the lines L′ L², or across the respective poles of the source G and its secondary coil $s^3$, connected in the conductor 4. The coils of the converter are so wound and connected with reference to each other that the current induced in the secondary coil will be in the same direction as that flowing through the conductor 4, so that the additional electro-motive force applied to this conductor will assist in maintaining a required difference of potential at the terminals of the primary coil of the converter C³. For the purpose of regulating the amount of the additional electro-motive force thus obtained, an adjustable self-inductive device or reactive coil, T, is connected in the primary circuit of the converter or regulator C³. This has the effect of reducing to a greater or less extent the difference of potential applied to the primary coil $p^3$ of the regulator, as may be required for changing the added difference of potential. The parts are so organized that when all the translating devices $d^2$ are being operated the induced electro-motive force thus obtained will approximately compensate for the loss or drop upon the line, so that an approximately constant difference of potential will be maintained at the terminals of the primary coil $p^2$ of the converter C². As translating devices are cut out of circuit, or the work being done is diminished, the loss upon the line will be decreased, and also the loss in the converter. By moving the core $t$ of the self-induction device T farther into the coils the difference of potential applied to the primary coils of the regulator C³ may be diminished, and consequently electro-motive force developed in the secondary coils $s^3$ may be gradually reduced until the difference of potential at the terminals of the secondary coil $s^2$ of the converter C² is reduced to the normal. In this way, by changing the reactive effect of the device T, the translating devices will be supplied with the proper difference of potential at all times.

In Fig. 2 a modification is illustrated in which the ratio of conversion of the converter may be adjusted by varying the length of one of the coils—the secondary, for instance—by means of a switch, S, applied to switch-points $s$, connected with different points in the length of that secondary coil. The adjustable reactive coil may be employed in connection with the adjustable converter, if desired. It is evident that two or more regulators, C³, may applied to any given feeder-circuit without departing from the spirit of my invention.

Where numerous different circuits of various lengths or losses are employed, a regulator of the character described may be applied to each of the circuits for the purpose of affording the required compensation.

In some instances it is desired to normally maintain a higher difference of potential upon one or more of the feeders than upon the others. This may be done in precisely the manner described with reference to compensating for the drop or loss. By varying the ratio of conversion the difference of potential applied to any given feeder may be increased as desired.

In another application of even date herewith the organization of apparatus herein described is claimed.

I claim as my invention—

1. The hereinbefore-described method of regulating the difference of potential upon an electric circuit, which consists in supplying to such circuit a difference of potential of a given value, deriving from the same source an induced electro-motive force approximately equivalent in value to the loss of potential upon said circuit, and in superposing such induced electro-motive force upon said circuit.

2. The hereinbefore-described method of maintaining a required difference of potential at the terminals of a variable number of translating devices connected in an electric circuit, which consists in applying a predetermined difference of potential to said circuit, deriving from the same source a variable difference of potential equivalent to or compensating for the variable loss of potential upon such circuit, and superposing the same upon said circuit.

3. The hereinbefore-described method of maintaining a normal difference of potential at the terminals of translating devices in two or more different circuits, which consists in applying to said circuits a given difference of potential, deriving independent electro-motive forces from the same source and applying the same to the respective circuits, and causing the effective value of the electro-motive force so applied to the respective circuits to approximately compensate for the loss upon that circuit due to the resistance thereof and to the amount of current traversing the same.

4. The hereinbefore-described method of maintaining a normal difference of potential at the terminals of the translating devices in two or more different circuits, which consists in applying to the terminals of all the circuits a given difference of potential, deriving a supplemental electro-motive force for one or more of said circuits, the value of which is dependent upon and variable with the loss of potential upon said circuit, and in applying such supplemental electro-motive force to such circuit or circuits.

In testimony whereof I have hereunto subscribed my name this 23d day of October, A. D. 1888.

LEWIS B. STILLWELL.

Witnesses:
CHARLES A. TERRY,
C. C. WOLFE.